United States Patent [19]

Geeting

[11] Patent Number: 5,537,777

[45] Date of Patent: Jul. 23, 1996

[54] INSECT CAPTURE DEVICE

[76] Inventor: Eliot Geeting, 76 Terra Vista, Dana Point, Calif. 92629

[21] Appl. No.: 544,778

[22] Filed: Oct. 8, 1995

[51] Int. Cl.⁶ ..................................... A01M 3/00
[52] U.S. Cl. ............................. 43/134; 15/119.1
[58] Field of Search ..................... 43/132.1, 133, 43/134, 135, 137; 15/119.1, 119.2

[56] References Cited

U.S. PATENT DOCUMENTS

| | | | |
|---|---|---|---|
| 109,720 | 11/1870 | Darnall | 43/137 |
| 719,383 | 1/1903 | Shych | 15/119.2 |
| 984,332 | 2/1911 | Whitehead | 43/137 |
| 1,261,957 | 4/1918 | Pewther | 43/135 X |
| 1,533,868 | 4/1925 | Kingman | 43/137 X |
| 1,656,969 | 1/1928 | Babl | 43/137 |
| 1,750,163 | 3/1930 | Disney | 43/134 |
| 3,364,512 | 1/1968 | Yamashita et al. | 15/119.1 |
| 4,694,605 | 9/1987 | Garcia et al. | 43/137 |

Primary Examiner—Joseph J. Hail, III
Assistant Examiner—Jay A. Stelacone
Attorney, Agent, or Firm—Goldstein & Associates

[57] ABSTRACT

An insect stopping and capturing device, comprising a handle with a compression chamber at one end of the handle. A shaft extends through the handle into the compression chamber where a soft head is attached to the shaft, the soft head larger than the diameter of the compression chamber. A hand grip is attached to the shaft opposite the compression chamber. From a comfortable distance, the user positions the soft head over a crawling or stationary insect. The hand grip is pulled away from the compression chamber to draw the soft head into the compression chamber to wrap the soft head around the insect as the head is being compressed. The insect can then be released outdoors by pushing the hand grip, which in turn ejects the insect. The insect may also be terminated by simply placing the compression chamber against a hard surface and then pushing the hand grip toward the surface. The head is compressed against the surface, crushing the insect contained therein. The user then lifts the device from the ground, and ejects the crushed insect remains.

7 Claims, 4 Drawing Sheets

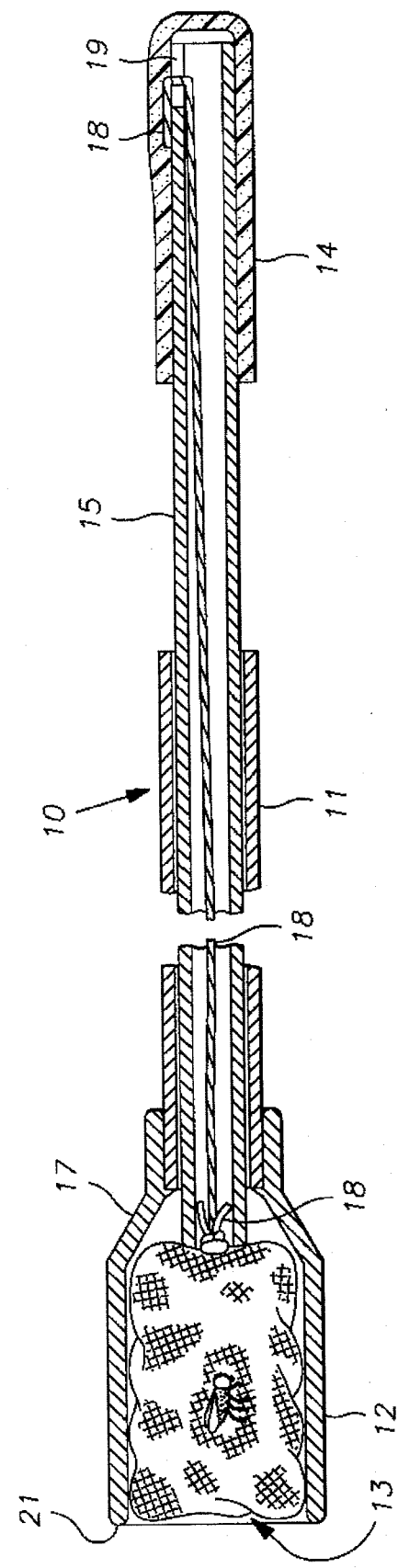
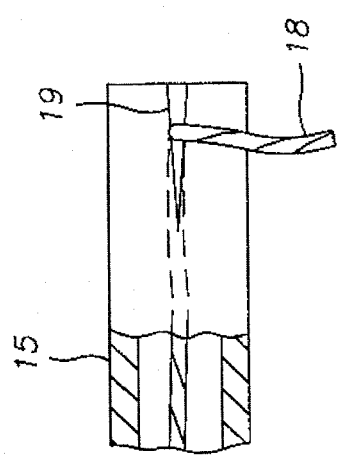
FIG. 5
FIG. 4

(12)

INSECT CAPTURE DEVICE

CROSS REFERENCES AND RELATED SUBJECT MATTER

This application relates to subject matter filed on Aug. 29, 1995 in provisional patent application Ser. No. 60/002,922 from which the applicant claims priority. This application also relates to subject matter contained in Disclosure Document 387,429, filed on Jul. 18, 1995.

BACKGROUND OF THE INVENTION

1. Field of the Invention

This invention relates to insect catching devices and more particularly to insect catchers that stop and trap moving insects without screens, smashing, spraying, adhesives, or vacuums.

2. Description of the Prior Art

Whether a person lives in the country, or in the city, insects are a fact of life. There is little that we can do to prevent insects from entering our homes and businesses. Once an insect is spotted, someone must confront the insect, or more will quickly follow. The most common methods of eliminating an insect is to smash it beneath a napkin, or to step on it. Both these methods are messy, and can stain floors, walls, and furniture.

Others have proposed devices which attempt to deal with the presence of insects. It has been consistently found that the devices currently available use one of the following basic methods: smashing devices such as swatters, suction, adhesives, tongs, nets, screens, poisons, or containment chambers.

Most swatters and smashing devices are simple in design, yet make a mess and are reliant on the surface the insect is resting on as one of the smashing surfaces. This makes a mess on the surface if too much force is used. Some are designed with a spongy surface to reduce the chance of making a mess, yet this also reduces their ability to function on larger, stronger insects. There are complex smashing devices that rely on the insect to voluntarily enter or land upon the device which will be used to terminate them.

Suction is yet another common method, performed either with an electric vacuum, or by some manual means of creating a vacuum-like chamber. These devices rely on an accurate approach to capture the insect, and when moving, this task can prove to be difficult to achieve. To have ample vacuum power, the nozzle opening has to be small. If a large opening is to be used, the vacuum power has to be very strong, which creates a large and cumbersome unit. Thus, this method is impractical for dealing with larger insects. In addition, any suction based device requires either a disposal bag, or that the user empty the containment chamber. They further require a complex device with accurate moving parts to create the suction, therefore is more expensive to manufacture and is more likely to malfunction.

Adhesives create a disposal problem—an insect becomes stuck on the adhesive surface and remains there until removed. This method is not very sanitary, and it is not easy to clean the stuck insects completely from the surface. Also, it is not possible to spare the insect, and this method causes the insect to struggle and die slowly.

Tongs and grabbing devices have hard edges, which can easily crush an insect instead of grabbing it. If you miss, you risk the chance of smashing or stabbing the insect, thereby making a mess upon the surface which they are on.

Nets and screens rely on two variables: the insect flying or walking into them, or the user's ability to contain the insect within the net or screen. Containment chambers similarly rely on some means of getting underneath the insect in order to close the lid on them, or by having them fly or walk into the chamber to be captured.

Poisons may be helpful for preventing insect infestation. However, they merely create an additional disposal problem when they are used upon a single wandering insect. In addition, poisons are undesirable to spray on cloth surfaces such as furniture or bedding. Further, poisons are also not suitable for use around children or pets.

None of the above methods solve the problem of capturing or killing insects in a variety of situations. All have a specific use and are limited in their effectiveness if used outside of that particular use. If they are more effective in the process of picking up an insect, such as with a vacuum device, they are more complex and costly, and still limit your options of saving or terminating the insect. The insect will die slowly in the chamber or bag, and still force someone to deal with removing them. To date there has not been a simple, inexpensive, effective way to stop and capture insects, or a device that allows for either instantaneous release or termination of the captured insect.

Thus, while these units may be suitable for the particular purpose employed, or for general use, they would not be as suitable for the purposes of the present invention as disclosed hereafter.

SUMMARY OF THE INVENTION

In view of the foregoing factors and conditions which are characteristic of the prior art, it is the primary objective of this new invention to provide an insect catching device that is extremely simple, inexpensive, effective, and easy to use: a device that will be more versatile and effective than the prior art when a user encounters an insect in the home, or anywhere else where they are not welcome.

This invention relates generally to insect catchers and more particularly to devices that are used for easy removal of insects from the home without making a mess.

In general, the invention is an insect stopping and capturing device, comprising a handle with a compression chamber at one end of the handle. A shaft extends through the handle into the compression chamber where a soft head is attached to the shaft, the soft head is larger than the diameter of the compression chamber. A hand grip is attached to the shaft opposite the compression chamber. From a comfortable distance, the user positions the soft head over a crawling or stationary insect. The hand grip is pulled away from the compression chamber to draw the soft head into the compression chamber to wrap the soft head around the insect as the head is being compressed. The insect can then be released outdoors by pushing the hand grip, which in turn ejects the insect. The insect may also be terminated by simply placing the compression chamber against a hard surface and then pushing the hand grip toward the surface. The head is compressed against the surface, crushing the insect contained therein. The user then lifts the device from the ground, and ejects the crushed insect remains.

It is an object of the invention to stop and capture an insect without smashing it, and then give the user the option to be humane to the insect by releasing it, or to compress and terminate the insect. Both capture and disposal is accomplished by a simple pull and push action on the hand grip.

It is not complex, employing a few parts, yet is extremely effective.

One aspect of the invention is to provide an effective device to eliminate many common household insects such as spiders, roaches, crickets, salamanders, moths, and many other bugs.

Another aspect of this invention is to provide a capturing area which is large enough to stop and capture large insects with less accuracy, with less fear of smashing them, than that found in other devices, except large nets and screens which require the insect to move into them, or else must be scooped under the insect.

Another aspect of the invention is that it will pick up insects off of any surface, hard or soft, and out of tight corners or hard to reach places. This is accomplished without having to smash the insect or harm the surface in any way. Because the grabbing action is an inward, upward, scooping action, there is no need to smash the insect against the surface they are on.

Another aspect of the invention is that the soft material head is configured in an uneven soft petal-like fashion so that even if pressed hard against the insect, it will not smash it, but rather wrap around it, engulfing the insect in folds or petals of the soft head. This soft petal-like configuration is also what allows the invention to conform to the shape of the surface that an insect is on, such as a base board or in a corner. Thus, the construction of the soft material head allows an insect to be pulled out of a corner without smashing it, or using a complex device such as a vacuum.

Another aspect of the invention is that the scooping and grabbing action is improved and enhanced by the porosity of the soft material head. The soft material head comprises an open weave mesh material that will hook the extremities of insects, and insure that if they try to escape when covered by the soft head that they will become entangled in the open weave mesh material.

Another aspect of the invention is that the open weave mesh acts like many tiny scoops when it is being drawn into the compression chamber in the hollow tube. This micro scooping action allows the invention to scoop up an insect as tiny as a small ant. The soft head will not mar or scratch walls or furniture, and will not snag or tear any cloth surfaces.

Another aspect of the invention is that once the insect is captured, the user can then set it free outdoors, or terminate it by placing the large opening of the compression chamber on a hard surface such as the ground, and compressing the head against the hard surface with a single push of the handle. This will kill the insect without making a mess in the soft head or on the hard surface. There is no need to touch, or even get close to the insect when catching or discarding it.

Another aspect of the invention is that if the user does not want to see any resemblance of the insect when releasing it, the insect can be pulverized by placing the large open end on the ground and pressing the handle in and out 5 to 6 times. This reduces non-shell insects to a liquid, and shelled insects are reduced to the shell and liquid.

Another aspect of the invention is that if the pulverizing action is taken, in time the soft head might accumulate insect residue. The invention is easily cleaned by simply rinsing the soft head in water. The entire invention is constructed of plastic and similar materials. Thus, water will not reduce its effectiveness and it will function either wet or dry.

Another aspect of the invention is that it can be used as a web duster. The long handle allows webs in ceiling corners to be dusted. The soft head can be moistened with water, this will catch the webs instead of just knocking them down. Once the device is dirty with dust and webs, it can be easily washed off with water.

Another aspect of the invention is that the ratio between the size of the compression chamber and the fully expanded soft mesh head which is drawn into the chamber, is what regulates the degree of compression and holding power. Thus allowing for picking up larger insects by adjusting the size of the chamber and mesh head. Also, added strength can be obtained be increasing the thickness and strength of the material used for the pick-up head.

Another aspect of the invention is that a variety of means can be used to draw the soft head in, and push it out of the compression chamber; such as spring loaded, air actuated, screw drive etc. Any means of creating a push-pull action can work. For low cost, simplicity of construction, and ease of use, the simple form of a manual operated, push-pull example is illustrated in this application as the preferred embodiment.

Other advantages will become apparent will be better understood by referencing the following detailed description, the drawing figures, and the claims.

BRIEF DESCRIPTION OF THE DRAWINGS

In the drawing figures, like elements are depicted by like reference numerals throughout the several views. The drawings are briefly described as follows.

FIG. 4 is a sectional view of the invention in the retracted position, detailing interior features of the insect capture device and detailing the attachment of the soft head to the shaft.

FIG. 5 is a view showing the slit in the end of the shaft, and showing how the twine locks into the slit.

DETAILED DESCRIPTION OF THE PREFERRED EMBODIMENT

Figures 1, 2:
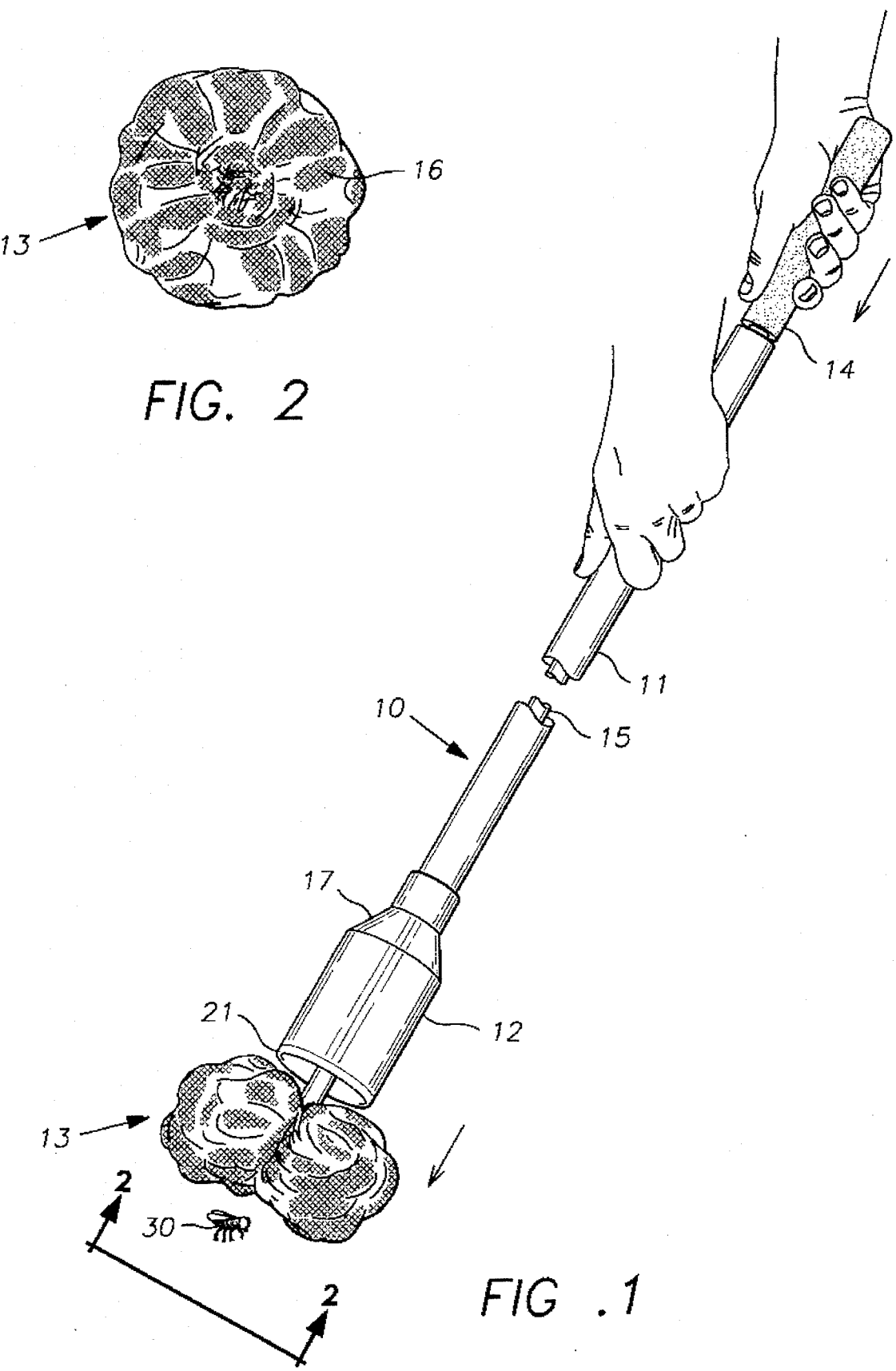
FIG. 1 is a perspective view of the invention in the ready position, in which it is ready to capture an insect in accordance with the invention.
FIG. 2 is a bottom plan view of the invention, detailing the soft mesh head.

FIG. 1 illustrates an insect capture device 10, comprising a hollow tubular handle 11. A shaft 15 extends fully through the handle 11. Affixed to one end of the shaft 15 is a hollow compression chamber end piece 12 with a large opening 21 that is larger in diameter than the handle 11. The transition between the diameter of the handle and that of the large opening 21 is made with an angled portion 17. The large opening 21 has a smooth radius with no sharp edges. The tubular handle 11 may, for example be about 2 feet in length and made of ¾ inch PVC pipe, and the compression chamber may, for example be made of injection molded PVC or ABS.

A hand grip 14 is attached to the shaft 15 opposite the compression chamber 12, and limits the travel of the shaft 15 in the direction of the compression chamber 12. The hand grip 14 is attached by press fit over the shaft 15 which for example may be made of ½ inch PVC pipe. A soft mesh head 13 is attached on the shaft 15 opposite the hand grip 14. The soft mesh head 13 is larger than the compression chamber 12 and is preferably two times the diameter of the compression chamber.

Figure 6:
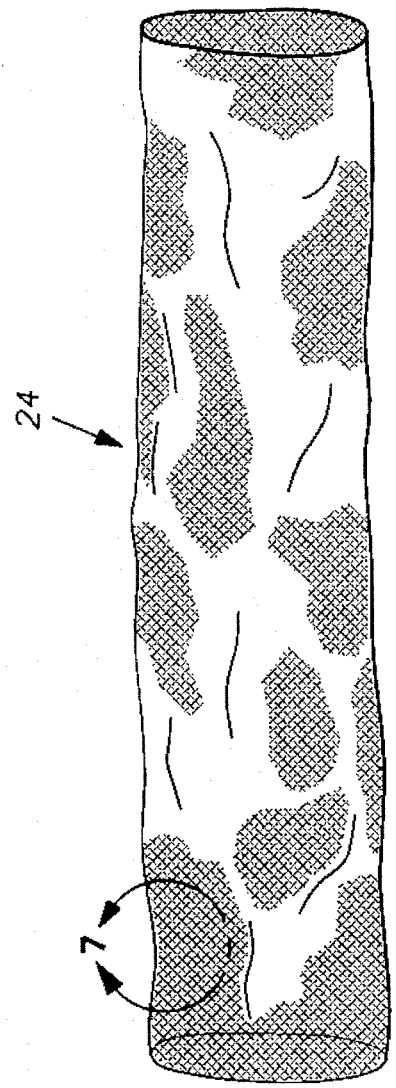
FIG. 6 is a top plan view illustrating the mesh material of the soft mesh head laid out flat.

Referring to FIG. 6 in conjunction with FIG. 1, the pick-up head 13 may comprise a length of continuous flexible mesh plastic bagging material 24. When laid flat the length of plastic bagging material could be 12 inches wide, and cut off to a length of 6 feet.

Figure 7:
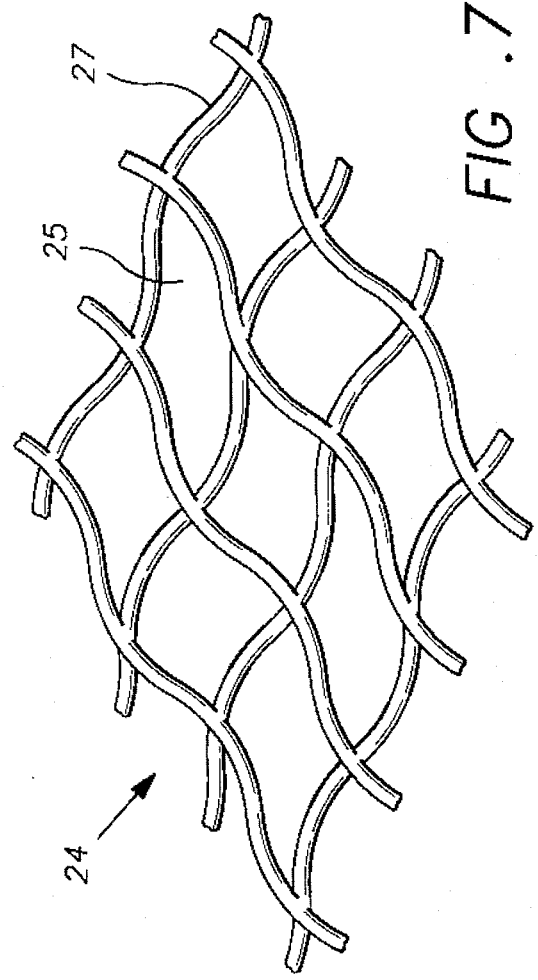
FIG. 7 is a enlarged perspective view, taken generally in the area of arrow 7 in FIG. 6.

Referring to FIG. 7, the flexible mesh material 24 comprises a criss-crossing network of independent sinusoidal structural members 27, joined together to form irregular trapezoidal openings 25. The size of the irregular trapezoidal opening are generally in the range of ⅛ to ¾ inch, preferably ⅛ to ¼ inch. Each structural member has a flexible, springy quality. The result is that the mesh material itself has a spring like quality. If the mesh material 24 is crumpled into a ball, and then released, it will immediately spring back. This property of instantly springing back is what makes the mesh material suitable for use in the mesh head 13.

Figure 8:
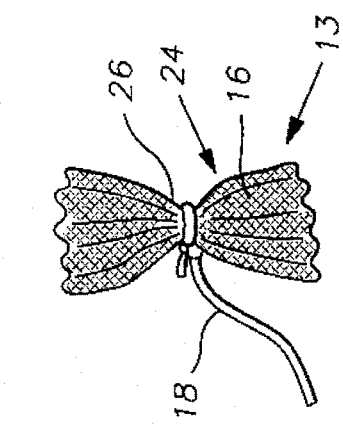
FIG. 8 is an elevational view, illustrating the mesh material being bunched together and tied to form the soft mesh head.
Figure 9:
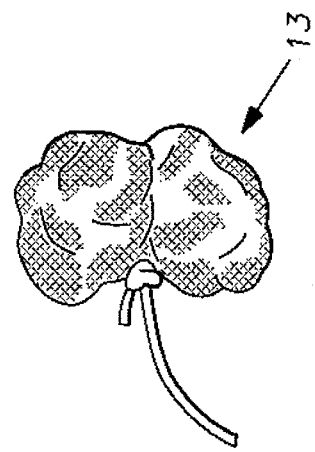
FIG. 9 is an elevational view, similar to FIG. 8, except with the soft mesh head "fluffed out" into a ball.

Referring to FIG. 8, to construct the soft mesh head 13, the length of flexible mesh material 24 is bunched and tied at its middle 26 with twine 18, such as poly-twine, to form the mesh head 13 into a ball, creating an uneven soft head with flower-like petals. Each petal has numerous small mesh holes 16 that hook and hold the extremities of large insects and scoop up small insects. Once tied, the soft mesh head 13 is "fluffed out" into a ball, as shown in FIG. 9.

Figure 3:
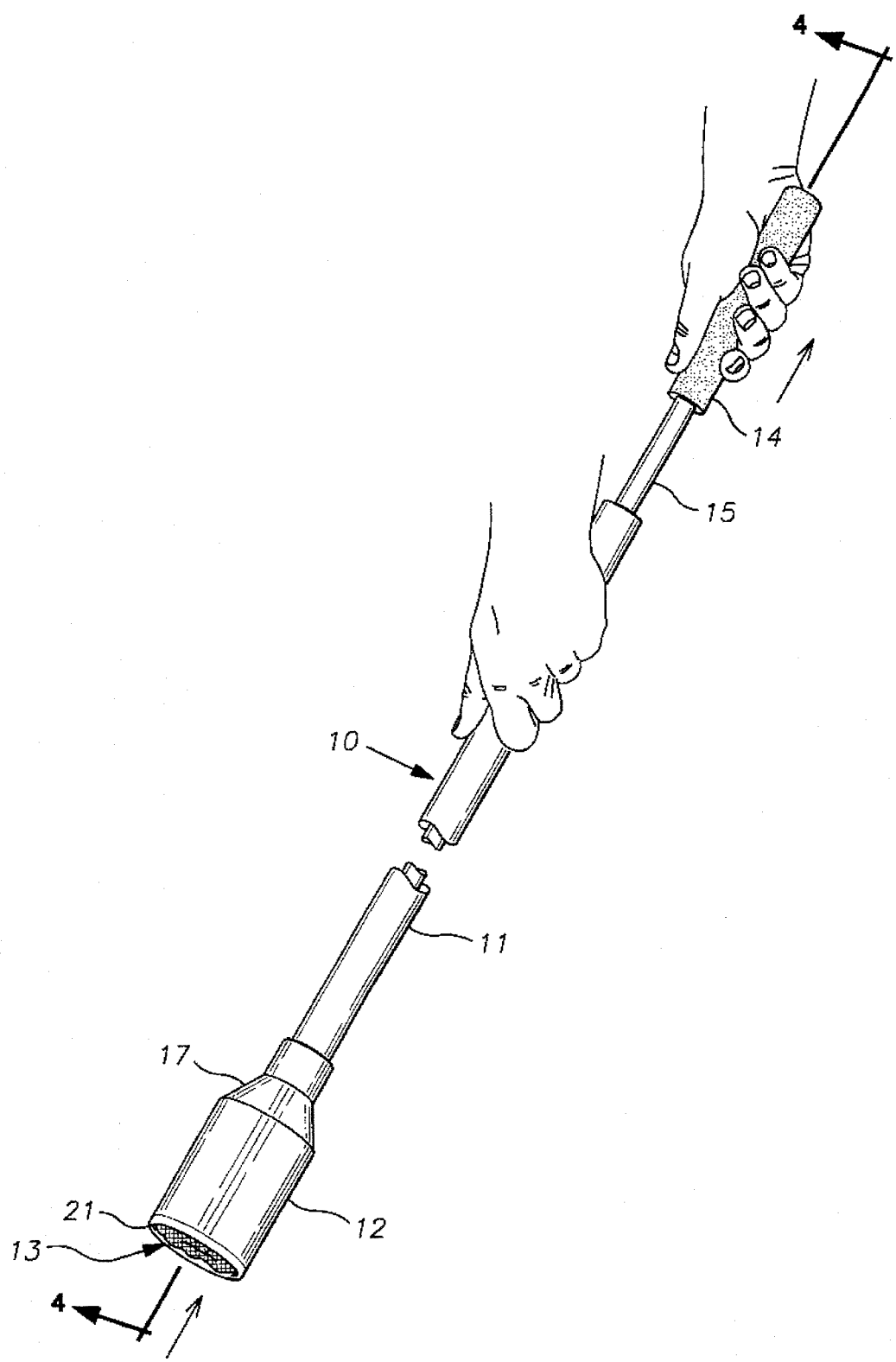
FIG. 3 is a perspective view of the invention in the retracted position, after pulling the hand grip and drawing the insect and soft mesh head inside the compression chamber.

FIG. 1 and FIG. 3 illustrates a temporal sequence in which the hand grip 14 has been pushed fully toward the handle 11 until further travel is prevented by the handle 11. The soft mesh head 13 is positioned over an insect 30. Then, as illustrated in FIG. 3, the hand grip 14 is pulled away from handle 11, drawing the head 13 into the large opening 21 of the compression chamber 12, creating an inward scooping action. The inward scooping action of the head 13 catches the insect 30 in the small mesh holes, by snagging extremities of the insect. The inward scooping action of the head 13 further engulfs the insect 30 in the middle of the head 13, drawing the insect into the compression chamber 12.

The insect 30 is ejected by simply pushing the hand grip 14 fully toward the handle 11. The head 13 is pushed out of the compression chamber 12 by the shaft 15, allowing the head 13 to once again expand to its original size, releasing the insect generally unharmed. If it is desired to first kill the insect before ejecting it, the large opening 21 is held directly above a hard surface, the hand grip 14 is pushed toward the handle 11 to compress the head 13 against the hard surface, thereby crushing the insect. The dead insect is then ejected as before.

Referring to FIG. 4 in conjunction with FIG. 3, the fact that the size of the mesh head 13 is considerably larger than the compression chamber 12 is what allows friction to hold the mesh head 13 securely in place. The angled portion 17 of the compression chamber 12 thus acts as a limit stop when pulling the hand grip 14 away from the handle 11. The edge of the hand grip 14 and the edge hollow tubular handle 11 meet and create a positive stop when pushing the hand grip 14 back toward the handle 11.

Referring to FIG. 4 and FIG. 5, the mesh head 13 is knotted together with the twine 18 to form the mesh head 13 into a ball. The knotted twine 18 holds the mesh head 13 together, and a length of the twine is strung down the length of the inside of the shaft 15. The twine 18 is pulled taut, is wrapped over the end of the shaft 15 opposite the mesh head 13, where it is pulled into a slit 19 in the shaft 15, thereby cinching and securing the mesh head 13 to the shaft 15. FIG. 5 shows how the twine 18 is secured in the slit 19 in the end of the shaft 15. Referring to FIG. 4 again, once the twine 18 is pulled taut and wrapped over the end of the shaft 15 opposite the mesh head 13, the shaft 15 is then pushed through the compression chamber and is slipped inside of the hollow handle 11. When the shaft 15 emerges from the handle 11 opposite the compression chamber 12, the hand grip up 14 is pressed on over the shaft 15, securing the twine 18 in place in the slit 19, as well as locking the shaft 15 inside of the hollow handle 11. This method of securing the twine 18, which in turn secures the mesh head 13 is a simple low cost method to attach the mesh head 13 without the use of clips, clamps, fasteners, holes or the adhesives.

Each component part works in conjunction with the others. All components perform multiple tasks. The hand grip 14 provides an actuation handle, secures the twine 18, and is also a positive stop for the shaft 15. The compression chamber 12 creates the scooping action of the head 13 and creates a positive stop. The twine 18 bundles the mesh head 13 and also secures the mesh head 13 to the shaft 15. The hollow handle 11 is a handle, a guide for the shaft 15, and also a positive stop. The shaft 15 is a channel for the twine 18, connects the hand grip 14 to the mesh head 13, conceals the knot and twine 18, and contains the locking slit 19 for the twine 18. The mesh head 13 is the capturing and scooping device, plus the ejection or termination device. The construction of this device is extremely simple, all parts are made wholly of waterproof plastic materials, there are no clips, pins or screws to break or corrode.

From the foregoing it is seen that the present invention provides an insect capturing device that is extremely simple, inexpensive, and easy to manufacture and use. It is durable and safe to use, with no metallic surfaces or sharp edges. Its structure is extremely well suited for its intended purpose.

Although the present invention has been described in some detail by way of written descriptions, illustrations and examples for purposes of clarity of understanding, it is understood that certain changes and modifications may be made within the spirit of the invention. It is not desired to limit the invention to the exact construction and operation shown and described, and accordingly, all suitable modifications and equivalents may be resorted to, falling within the scope of the invention.

What is claimed is:

1. An insect pickup tool, for capturing an insect, comprising:

a soft material head, the head is comprised of a sheet of flexible mesh material having a plurality of diamond shaped openings, the sheet of flexible mesh material is bunched up, forming a middle which is tied to form a ball having a plurality of petals;

a compression chamber having a large opening, the large opening smaller in size than the soft material;

a shaft, the shaft extending into the compression chamber, the head attached to one end of the shaft, the shaft capable of pulling the head into the large opening of the compression chamber to compress the head thereby creating a scooping action that entangles and captures an insect in the head;

a hollow handle, having a diameter, the compression chamber attached to one end of the handle, the shaft extending through the handle, the head limiting travel of the shaft at one end, the compression chamber further comprises an angled portion that makes a transition between the diameter of the handle and that of the large opening;

a hand grip, attached to the shaft opposite the compression chamber, the hand grip limiting travel of the shaft toward the compression chamber; and a twine, the twine is knotted around the head, extends through the shaft, and is attached to the shaft opposite the head by the hand grip.

2. An insect pickup tool for capturing an insect, comprising:

a soft material head, formed generally into a ball;

a compression chamber having a large opening, the large opening smaller in size than the soft material head;

a shaft, the shaft extending into the compression chamber, the head attached to one end of the shaft, the shaft capable of pulling the head into the large opening of the compression chamber to compress the head thereby creating a scooping action that entangles and captures in insect in the head;

a hollow handle, having a diameter, the compression chamber attached to one end of the handle, the shaft extending through the handle, the head limiting travel of the shaft at one end;

a hand grip, attached to the shaft opposite the compression chamber, the hand grip limiting travel of the shaft toward the compression chamber; and twine, the twine knotted around the head, extending through the shaft, attached to the shaft opposite the head by the hand grip.

3. The insect pickup tool as recited in claim 2, wherein the shaft further has a slit opposite the head, the twine bent over the slit, and held in place by the hand grip.

4. An insect handling method, using an insect pickup tool having a soft mesh head having a plurality of openings, a compression chamber having a large opening that is smaller in diameter than the mesh head, and a shaft, the shaft extending into the compression chamber, the mesh head secured to the shaft, comprising the steps of:

positioning the mesh head over the insect:

capturing the insect in the mesh head, by compressing the mesh head around the insect, by drawing the mesh head into the compression chamber, by pulling the shaft away from the compression chamber.

5. The insect handling method as recited in claim 4, further comprising the steps of:

bringing the insect pickup tool to a suitable location for insect disposal; and ejecting the insect, by expanding the mesh head, by pushing the mesh head out of the large opening of the compression chamber, by pushing the shaft toward the compression chamber.

6. The insect handling method as recited in claim 4, further comprising the steps of:

placing the large opening of the compression chamber over a hard surface; and crushing the insect by pushing the mesh head toward the hard surface.

7. The insect handling method as recited in claim 6, further comprising the step of:

ejecting the crushed insect remains by expanding the mesh head, by pushing the mesh head out of the compression chamber, by pushing the shaft toward the compression chamber.

* * * * *